United States Patent
Martin et al.

(10) Patent No.: US 8,033,515 B2
(45) Date of Patent: Oct. 11, 2011

(54) SYSTEM FOR MOUNTING DEVICES TO A DISPLAY

(75) Inventors: Randall W. Martin, The Woodlands, TX (US); Paul L. Drew, The Woodlands, TX (US); David Quijano, Magnolia, TX (US); Morten Warren, Surrey (GB); Nick Woodley, London (GB); Stephen de Saulles, London (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 902 days.

(21) Appl. No.: 11/253,186

(22) Filed: Oct. 17, 2005

(65) Prior Publication Data

US 2007/0138360 A1 Jun. 21, 2007

(51) Int. Cl.
*A47B 96/00* (2006.01)

(52) U.S. Cl. ........................ 248/224.61; 248/918; 40/729

(58) Field of Classification Search .................. 248/917, 248/918, 220.31, 223.41, 224.8, 476, 477, 248/442.2, 220.22, 224.61, 224.7, 225.11; 361/681; 348/843, 844; 403/295, 335, 336, 403/337, 338, 262, 292; 40/210, 606.19, 40/605, 729, 730
See application file for complete search history.

(56) References Cited

U.S. PATENT DOCUMENTS

| | | | |
|---|---|---|---|
| 4,017,989 A * | 4/1977 | Murray | 40/731 |
| 4,681,378 A | 7/1987 | Hellman, III | |
| 4,736,826 A | 4/1988 | White et al. | |
| 4,866,215 A | 9/1989 | Muller et al. | |
| 5,018,052 A | 5/1991 | Ammon et al. | |
| 5,021,968 A | 6/1991 | Ferketic | |
| 5,128,662 A * | 7/1992 | Failla | 345/1.3 |
| 5,272,988 A | 12/1993 | Kelley et al. | |
| 5,286,919 A | 2/1994 | Benson et al. | |
| 5,432,505 A | 7/1995 | Wise | |
| 5,473,994 A | 12/1995 | Foley et al. | |
| 5,515,037 A | 5/1996 | Wise | |
| 5,523,747 A | 6/1996 | Wise | |
| 5,541,586 A | 7/1996 | Wise | |
| 5,615,682 A | 4/1997 | Stratz, Sr. | |
| 5,640,482 A | 6/1997 | Barry et al. | |
| 5,655,833 A * | 8/1997 | Raczynski | 362/419 |
| 5,769,374 A * | 6/1998 | Martin et al. | 248/221.11 |
| 5,804,765 A | 9/1998 | Siemon et al. | |
| 5,831,211 A | 11/1998 | Gartung et al. | |
| 5,833,332 A | 11/1998 | Marshall et al. | |

(Continued)

FOREIGN PATENT DOCUMENTS

JP 2005148347 A * 6/2005

OTHER PUBLICATIONS

Ergotron, Flat Panel Mounting Solutions, Desk Stand 100- Range of Motion, Copyright 2005 (search completed Sep. 30, 2005) (2 pgs.) (http://www.ergotron.com/3_products/flat_panel/deskstands/range.asp).

*Primary Examiner* — A. Joseph Wujciak, III

(57) ABSTRACT

In certain embodiments, there is provided a system including a display, a mounting groove disposed along a portion of the first display, and a mount position along the mounting groove. In these embodiments, the mount position includes an alignment structure disposed in the mounting groove and a fastener disposed in the mounting groove.

8 Claims, 4 Drawing Sheets

U.S. PATENT DOCUMENTS

| | | | |
|---|---|---|---|
| 5,850,998 A * | 12/1998 | Parsey et al. | 248/223.21 |
| 5,852,545 A * | 12/1998 | Pan-Ratzlaff | 361/683 |
| 5,893,539 A | 4/1999 | Tran et al. | |
| 5,921,402 A | 7/1999 | Magenheimer | |
| 5,957,556 A | 9/1999 | Singer et al. | |
| 5,995,179 A * | 11/1999 | Tamura et al. | 349/58 |
| 6,016,252 A | 1/2000 | Pignolet et al. | |
| 6,050,849 A | 4/2000 | Chang | |
| 6,151,206 A * | 11/2000 | Kato et al. | 361/681 |
| 6,202,567 B1 | 3/2001 | Funk et al. | |
| 6,284,978 B1 | 9/2001 | Pavillard et al. | |
| 6,303,864 B1 | 10/2001 | Johnson et al. | |
| 6,305,556 B1 | 10/2001 | Mayer | |
| 6,326,547 B1 | 12/2001 | Saxby et al. | |
| 6,327,139 B1 | 12/2001 | Champion et al. | |
| 6,330,168 B1 | 12/2001 | Pedoeem et al. | |
| 6,363,198 B1 | 3/2002 | Braga et al. | |
| 6,407,933 B1 | 6/2002 | Bolognia et al. | |
| 6,409,134 B1 | 6/2002 | Oddsen, Jr. | |
| 6,427,936 B1 | 8/2002 | Noel et al. | |
| 6,435,106 B2 | 8/2002 | Funk et al. | |
| 6,435,354 B1 | 8/2002 | Gray et al. | |
| 6,483,709 B1 | 11/2002 | Layton | |
| 6,525,273 B1 | 2/2003 | Cunningham | |
| 6,533,723 B1 | 3/2003 | Lockery et al. | |
| 6,546,181 B1 | 4/2003 | Adapathya et al. | |
| 6,554,218 B2 | 4/2003 | Buyce et al. | |
| D477,325 S | 7/2003 | Theis et al. | |
| 6,600,665 B2 | 7/2003 | Lauchner | |
| 6,609,691 B2 | 8/2003 | Oddsen, Jr. | |
| 6,619,606 B2 | 9/2003 | Oddsen, Jr. et al. | |
| 6,637,104 B1 | 10/2003 | Masuda et al. | |
| 6,646,893 B1 | 11/2003 | Hardt et al. | |
| 6,713,678 B2 | 3/2004 | Masuda et al. | |
| 6,719,253 B2 | 4/2004 | Oddsen, Jr. | |
| 6,721,414 B1 | 4/2004 | Rojas et al. | |
| 6,724,970 B2 | 4/2004 | Adapathya et al. | |
| 6,726,167 B2 | 4/2004 | Oddsen, Jr. | |
| 6,805,248 B2 | 10/2004 | Champion et al. | |
| 6,811,039 B2 | 11/2004 | Chen et al. | |
| 6,856,505 B1 | 2/2005 | Venegas et al. | |
| 6,902,069 B2 | 6/2005 | Hartman et al. | |
| 6,915,994 B2 | 7/2005 | Oddsen, Jr. | |
| 7,103,380 B1 * | 9/2006 | Ditzik | 455/556.2 |
| 7,215,389 B2 * | 5/2007 | Shida | 349/58 |
| 2001/0013305 A1 | 8/2001 | Funk et al. | |
| 2001/0023914 A1 | 9/2001 | Oddsen, Jr. | |
| 2001/0024904 A1 | 9/2001 | Fischer | |
| 2002/0066843 A1 | 6/2002 | Oddsen, Jr. et al. | |
| 2002/0073516 A1 | 6/2002 | Behar | |
| 2002/0074460 A1 | 6/2002 | Behar | |
| 2003/0010862 A1 | 1/2003 | Buyce et al. | |
| 2003/0026084 A1 | 2/2003 | Lauchner | |
| 2003/0037953 A1 | 2/2003 | Sarkinen et al. | |
| 2003/0066936 A1 | 4/2003 | Beck et al. | |
| 2003/0075646 A1 | 4/2003 | Womack et al. | |
| 2003/0075655 A1 | 4/2003 | Oddsen, Jr. | |
| 2003/0080268 A1 | 5/2003 | Oddsen, Jr. | |
| 2003/0123832 A1 | 7/2003 | Adapathya et al. | |
| 2003/0168238 A1 | 9/2003 | Masuda et al. | |
| 2003/0222034 A1 | 12/2003 | Champion et al. | |
| 2003/0234328 A1 | 12/2003 | Oddsen, Jr. | |
| 2004/0065787 A1 | 4/2004 | Hardt et al. | |
| 2004/0079711 A1 | 4/2004 | Hartman et al. | |
| 2004/0108289 A1 | 6/2004 | Chen et al. | |
| 2004/0114313 A1 | 6/2004 | Mata et al. | |
| 2004/0149533 A1 | 8/2004 | Milano | |
| 2004/0182798 A1 | 9/2004 | Williams | |
| 2004/0222344 A1 | 11/2004 | Oddsen, Jr. | |
| 2005/0057912 A1 | 3/2005 | Hardt et al. | |
| 2005/0067358 A1 | 3/2005 | Lee et al. | |
| 2005/0076479 A1 | 4/2005 | Rolla et al. | |
| 2005/0135767 A1 | 6/2005 | Diaz et al. | |
| 2006/0238967 A1 * | 10/2006 | Carson et al. | 361/681 |
| 2006/0262085 A1 * | 11/2006 | Yang | 345/156 |

* cited by examiner

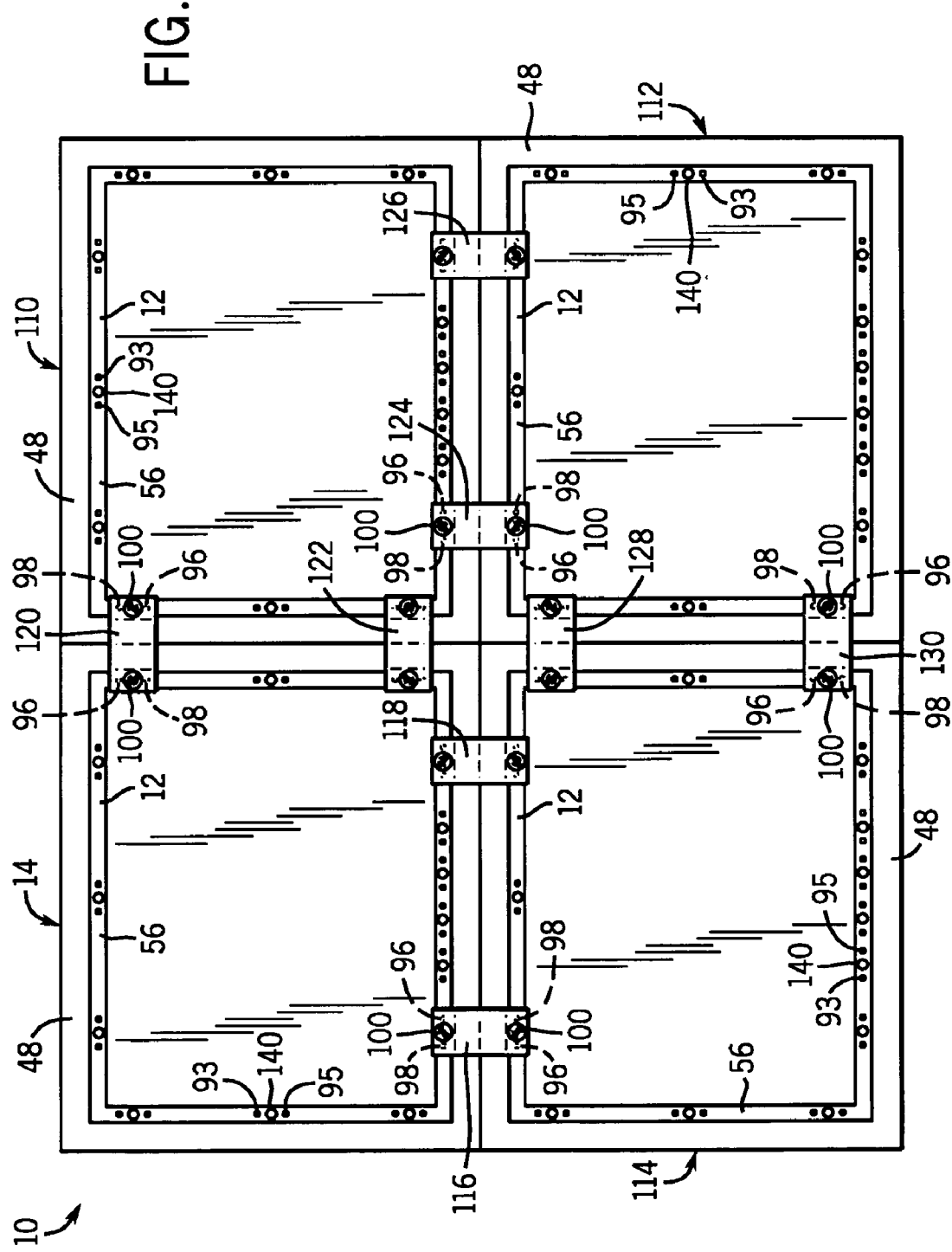

SYSTEM FOR MOUNTING DEVICES TO A DISPLAY

BACKGROUND

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

Personal computer systems generally include a computer chassis, a display, and some number of peripheral devices. The peripheral devices are typically mounted on a desktop or in the vicinity of the display. Unfortunately, the peripheral devices are generally independent from one another and the display. As a result, the desktop is cluttered with the various peripheral devices and the associate cables. The peripheral devices also may be disposed in undesirable positions or angles on the desktop due to limited space. For example, speakers, microphones, or web cameras may become entangled or blocked by other items on the desktop.

BRIEF DESCRIPTION OF THE DRAWINGS

Advantages of one or more disclosed embodiments will become apparent upon reading the following detailed description and upon reference to the drawings in which:

FIG. 7 is a rear view of four displays that are coupled to one another with a mounting system in accordance with the embodiments of the present technique.

DETAILED DESCRIPTION OF SPECIFIC EMBODIMENTS

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The following discussion describes a system for mounting peripheral devices to a display. In certain embodiments, the present technique provides a standardized system for mounting a variety of peripheral devices to a display. Additionally, in certain embodiments, the present technique provides a mounting system that securely locates peripheral devices at discrete points on the display. Specifically, as is described in greater detail below, certain embodiments include a mounting groove, rail, or channel having fastening mechanisms along the perimeter and/or the rear of the display with a number of mount positions located within the mounting groove.

Figure 1:
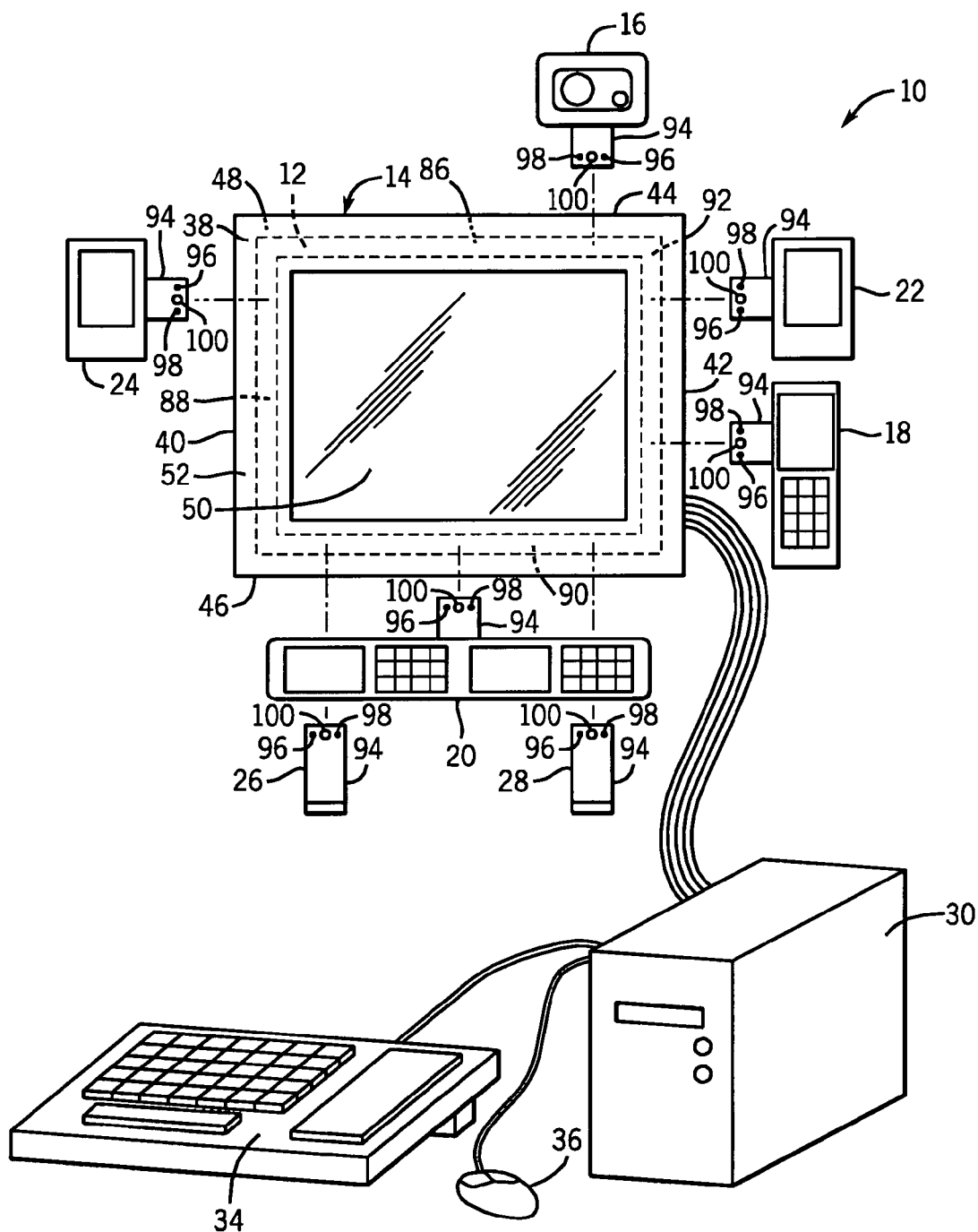
FIG. 1 is a partially exploded view of a computer system having a display with a mounting system for peripherals in accordance with embodiments of the present technique.

FIG. 1 depicts a computer system 10 with a mount system 12 on a display 14 in accordance with the embodiments of the present technique. The illustrated computer system 10 includes a variety of peripheral devices 16-28, a computer 30, a keyboard 34, and a mouse 36. As is explained in greater detail below, the peripheral devices 16-28 couple to the display 14 through the mount system 12.

In the illustrated embodiment, the display 14 is a flat-panel liquid crystal display (LCD). However, it should be noted that in other embodiments, the display 14 may include a cathode ray tube (CRT), an organic light emitting diode (OLED) display, a plasma display, a surface-conduction electron-emitter display (SED), a liquid crystal on silicon (LCOS) display, a digital light processor (DLP) display, an electronic paper display, or any other display configured to support a peripheral device, for example. The display 14 includes a front face 38, a left face 40, a right face 42, a top face 44, a bottom face 46, and a rear face 48. The front face 38 includes a display screen 50 and a bezel 52.

A variety of peripheral devices 16-28 couple to the display 14 of the present embodiment. The peripheral devices 16-28 include a web cam 16, a phone 18, a phone panel 20, a right speaker 22, a left speaker 24, a left support leg 26, and a right support leg 28. The phone 18 may include a handset and/or a handset holder, and the phone panel 20 may include a numeric key pad, telephone function keys, facsimile function keys, a display, or other alphanumeric keys. As will be appreciated, the peripheral devices 16-28 are merely exemplary, and a variety of other peripheral devices may couple to the display 14. For example, the display 14 may support a mirror, a vase, a light, a computer port, a memory card reader, a biometric security device (e.g., fingerprint reader), a fan, a paper holder, an electronic digitizer pen holder, a wall mount, a security cable, a credit card magnetic stripe reader, a bar code scanner, a picture frame, a hand-held electronic-device docking station, a microphone, a display privacy blinder, a display polarizer, an anti-reflective screen, a key pad, a number pad, a touch pad, another display, a wireless-input-device re-charging station, a remote control sensor, a game console interface, a printer, a scanner, a facsimile machine, a communications hub (e.g., a universal serial bus hub), and/or an external memory device.

The illustrated computer 30 may be a personal computer, a server, a work station, a palmtop, a laptop, a tablet personal computer, a desktop, a mainframe, a supercomputer, or a thin client, for example. Thus, the computer 30 may include a motherboard, one or more processors, a hard drive, random access memory (RAM) modules, a video card, an audio card, a networking card, an optical drive (e.g., CD and/or DVD drive), a floppy disk drive, and so forth. In some embodiments, the components of the computer 30 are partially or entirely integrated into a single housing with the display 14.

In other words, the display 14 and computer 30 may embody an all-in-one computer or a panel personal computer, wherein the display screen 50 and computer components are assembled and connected together inside a single housing as a standalone unit. In other embodiments, a variety of devices may connect to the display 14, such as a cable box, a DVD player, a video cassette recorder (VCR), a digital video recording device, a game console, and any device configured to generate an image on the display 14, or some combination of these devices, for instance.

In operation, the peripheral devices 16-28 connect to the display 14 at predetermined locations through the mount system 12. As is described in greater detail below, the mount system 12 positions and secures the peripheral devices 16-28. For example, in certain embodiments, the mount system 12 positions the web cam 16 to cooperate with software operated on the computer 30. Additionally, in some embodiments, the mount system 12 positions the left speaker 24 and/or the right speaker 22 to cooperate with sound generating software on the computer 30. In other embodiments, the mount system 12 positions the phone 18 and/or the phone panel 20 to cooperate with software operated on the computer 30. As will be appreciated, other peripheral devices, such as those listed above, may also cooperate with software on the computer 30. In certain embodiments, a peripheral device cooperates with software if the software either adjusts an operation based on the location of the peripheral device or specifies a discrete location of the peripheral device on the mount system 12 or display 14. The software, for example, may select an optimal position of the peripheral device or optimize operational parameters of the peripheral device based on the mounted position on the mount system 12.

Figure 2:
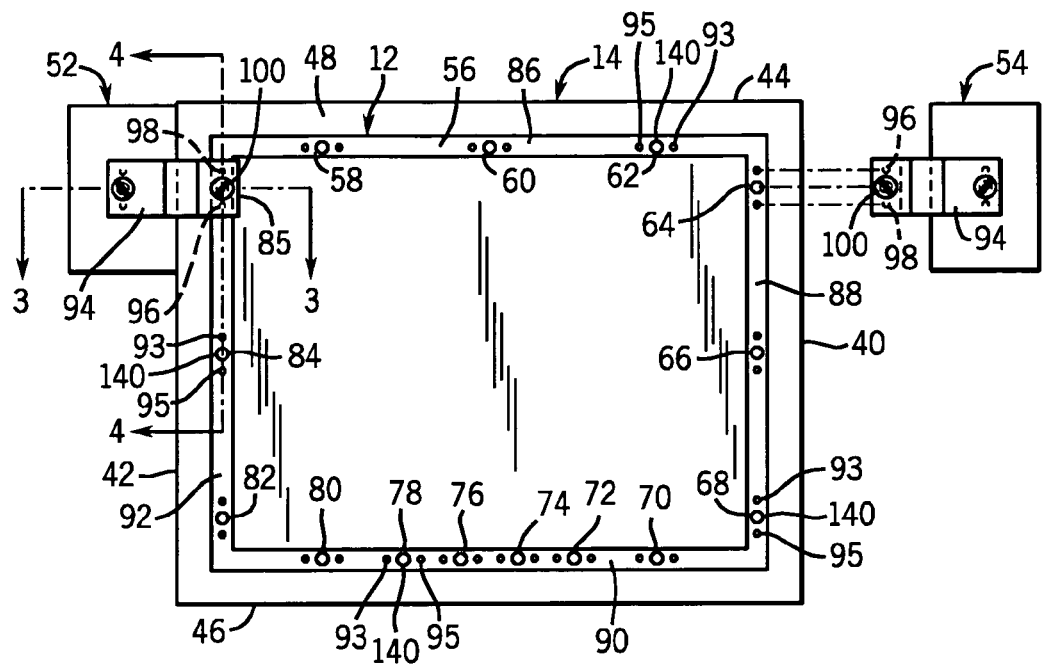
FIG. 2 is a profile view of the rear face of a display with a mounting system for peripherals in accordance with embodiments of the present technique.

FIG. 2 depicts a rear view of the display 14 to illustrate the mount system 12 in greater detail. As illustrated, the display 14 includes a pair of exemplary peripheral devices 52-54 coupled to the mount system 12 on the rear face 48. The illustrated mount system 12 includes a mounting rail, slot, channel or groove 56 having a plurality of mount positions, such as fourteen mount positions 58-85. However, as will be appreciated, other embodiments may include a different number of discrete mount positions. Other embodiments may be configured to mount peripherals at any position along the length of the groove 56.

The exemplary mounting groove 56 includes four subgrooves 86-92, which each lie generally parallel to the sides of the display 40-44. In other words, the illustrated groove 56 has a generally rectangular frame-shaped configuration defined by the four subgrooves 86-92. It should be noted that a variety of arrangements of subgrooves may be employed in accordance with the present technique. For example, other embodiments may include other numbers and geometrical configurations of subgrooves such as 1, 2, 3, 4, 5, 6, 7, 8, or more grooves that are independent or connected to one another. By further example, other embodiments may include parallel, perpendicular, sequential, concentric, triangular, or other patterns of subgrooves or multiple shorter subgrooves in place of a single, longer subgroove. While the illustrated subgrooves 86-92 intersect at the ends of the subgrooves 86-92, other embodiments in accordance with the present technique may employ shorter subgrooves that do not intersect or longer subgrooves that intersect and extend past one another. The illustrated subgrooves 86-92 are substantially straight and of constant width along the length of the respective subgrooves 86-92. However, other embodiments may employ curved subgrooves and/or subgrooves that vary in width.

The illustrated mounting groove 56 in other embodiments is disposed on the rear face 48 of the display 14. As will be appreciated, the mounting groove 56 may also be disposed wholly or in part on the front face 38, the left face 40, the right face 42, the top face 44, the bottom face 46, or combinations thereof. For example, the subgrooves 86-92 may extend lengthwise along the top face 44, the left face 40, the bottom face 46, and the right face 42, respectively. Alternative, a plurality of grooves may be disposed on the rear face 48 perpendicular to the top, left, bottom, and right faces 44, 40, 46, and 42. Each of these grooves may secure a specific peripheral device. The grooves also may extend from the rear face 48 onto the top, left, bottom, and right faces 44, 40, 46, and 41. For example, each of the fourteen mount positions 58-85 may include a groove along the rear face 48 and perpendicular to the respective face 44, 40, 46, or 42. Again, a variety of configurations of discrete or continuous grooves are within the scope of the disclosed mount system 12.

A number of exemplary mount positions 58-85 are disposed within the mounting groove 56 of the illustrated embodiment. Each mount position 58-85 includes a pair of alignment structures, e.g., alignment holes 93 and 95, and a fastener 140, e.g., internally threaded fastener or nut integrated within the mounting groove 46. In the illustrated embodiment, the fastener 140 is disposed between the alignment structures 93 and 95 in each mount position 58-85. However, as will be appreciated, the arrangement of the fastener 140 and the alignment structures 93 and 95 may be different in alternate embodiments. For instance, the alignment structures 93 and 95 may be placed adjacent one another with the fastener to one side or the other. In other embodiments, each mount position 58-85 includes only one alignment structure 93 and one fastener 140. Alternatively, embodiments in accordance with the present technique may omit alignment structures 93 and 95 entirely and simply include a fastener 140. The illustrated mount positions 58-85 are separated by some distance, but in other embodiments the mount positions 58-85 may overlap, thereby sharing alignment structures 93 and 95. In other words, the groove 56 may have a series of alternating fasteners and alignment structures. Additionally, it should be noted that some embodiments in accordance with the present technique may include more than one fastener 140 and/or more than two alignment structures 93 and 95. While the present embodiment includes alignment structure 93 and 95 and fasteners 140 disposed within the mounting groove, other embodiments in accordance with the present technique may include one or more of these components 93, 95 and 140 located outside of the mounting groove 56. Similarly, other embodiments may not include a mounting groove 56.

Each exemplary peripheral device 52-54 includes a mounting bracket or support member 94, a pair of mating alignment structures, e.g., alignment pins 96-98, and a mating fastener, e.g., externally threaded fastener or bolt 100. In the present embodiment, the mating fastener 100 is disposed between the mating alignment structures 96-98 on the support member 94, and these structures 96-100 are all disposed at a distal end of the support member 94. As will be appreciated, in other embodiments, the position and number of alignment structures 96-98 and mating fasteners 100 may be modified to complement the alternate embodiments of the mount positions 58-85 discussed above. Moreover, other embodiments may include wider or longer support members to couple to multiple mount positions 58-85. These embodiments may also include multiple sets of mating alignment members 96-98 and mating fasteners 100. In yet further embodiments, the support member 94 may have a sliding rail structure that fits and slides lengthwise along the groove 56 to a desired mount position. At the desired position, the sliding rail structure may be secured to the groove 56 via a latch, a snap-fit mechanism, Velcro, a threaded fastener (e.g., a thumb screw), a cam mechanism, a wedge or expanding mechanism, or combinations thereof. For example, a portion of the sliding rail structure may expand across (i.e., transverse to) the groove 56 in response to a twisting motion (e.g., a cam) or a linear motion (e.g., wedging).

In operation, the peripheral devices 54-52 cooperate with the mount system 12 to secure the peripheral devices 52-54 to the display 14. Specifically, the mating alignment structures 96-98 interface with the alignment structures 93 and 95 to align the peripheral devices 52-54 with one of the mount positions 58-85, and the mating fastener 100 interfaces with the fastener 140 to secure one of the peripheral devices 52-54. The illustrated support members 94 extends beyond a side 40-44 of the display 14 to position the peripheral devices 52-54 for convenient use by a user.

Figure 3:
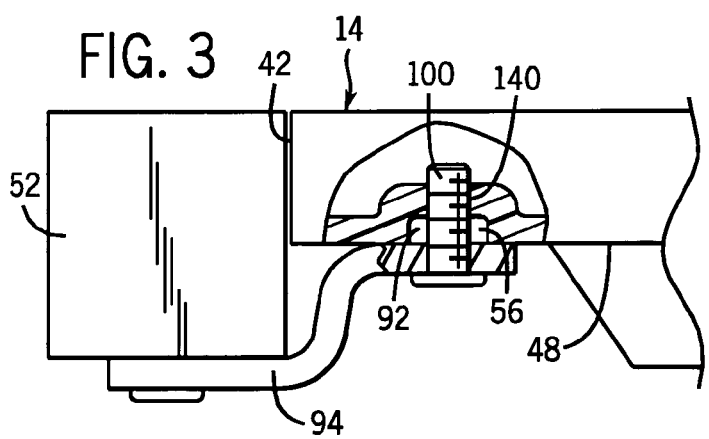
FIG. 3 is a partial cross-sectional view of the mounting system on the display of FIG. 2, illustrating a peripheral device having a support member coupled to a groove in the display.

FIG. 3 is a cross-sectional view of the embodiment of FIG. 2. The illustrated mounting groove 56 is integrally formed in the rear face 48 and includes a four degree draft to facilitate separation from a mold. In the present embodiment, the fastener 140 is a threaded aperture in the bottom of the mounting groove 56. The exemplary mating fastener 100 extends from the support member 94, through the mounting groove 56, and into the fastener 140. The illustrated mating fastener 100 is in threaded engagement with the fastener 140. It should be noted that other embodiments in accordance with the present technique may employ different types of fasteners 140 and mating fasteners 100. The illustrated fastener 140 is integrated into the rear face 48 of the display 14. However, in alternate embodiments, the fastener 140 may include a separate component, such as a threaded nut that is recessed within or extends from the rear face 48, a threaded portion of a metal sheet lying behind the rear face 48, or some combination of these components, for example. In certain embodiments, the mounting system 12 including the mount positions 58-85 may be disposed on a removable panel that is coupled to a desired display. For example, such a removable panel may include fastening devices to couple (or retrofit) the panel with the mounting system 12 to a new or pre-existing display. The fastening devices may include threaded fasteners, Velcro, double stick adhesive tape, etc.

Figure 4:
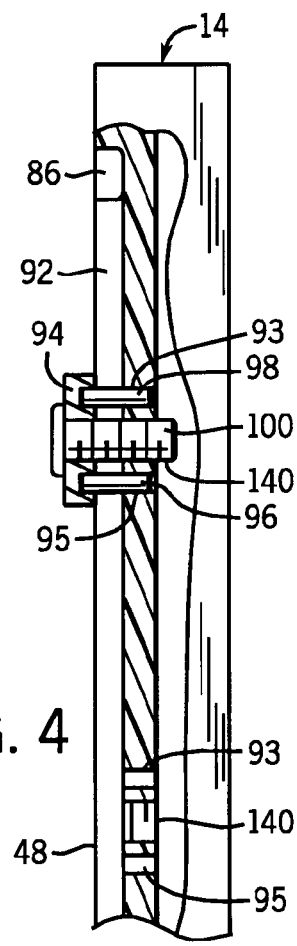
FIG. 4 is a partial cross-sectional view of the mounting system on the display of FIG. 2, illustrating a fastener and a pair of alignment structures coupling the support member to the groove.

FIG. 4 is a cross-sectional view from a perspective that is perpendicular to that of FIG. 3. In the illustrated embodiment, the alignment structures 93 and 95 receive mating alignment structures 96-98 respectively. The illustrated alignment structures are cylindrical apertures in the bottom of the mounting groove 56. The mating alignment structures 96-98 extend from the support member 94, through the mounting groove 56, and into alignment structures 93 and 95. The exemplary mating alignment structures 96-98 are cylindrical members that complement the alignment structures 96-98. Of course, alignment structures 93 and 95 and mating alignment structures 96-98 with non-cylindrical shapes may also be employed in accordance with the present technique.

Figure 5:
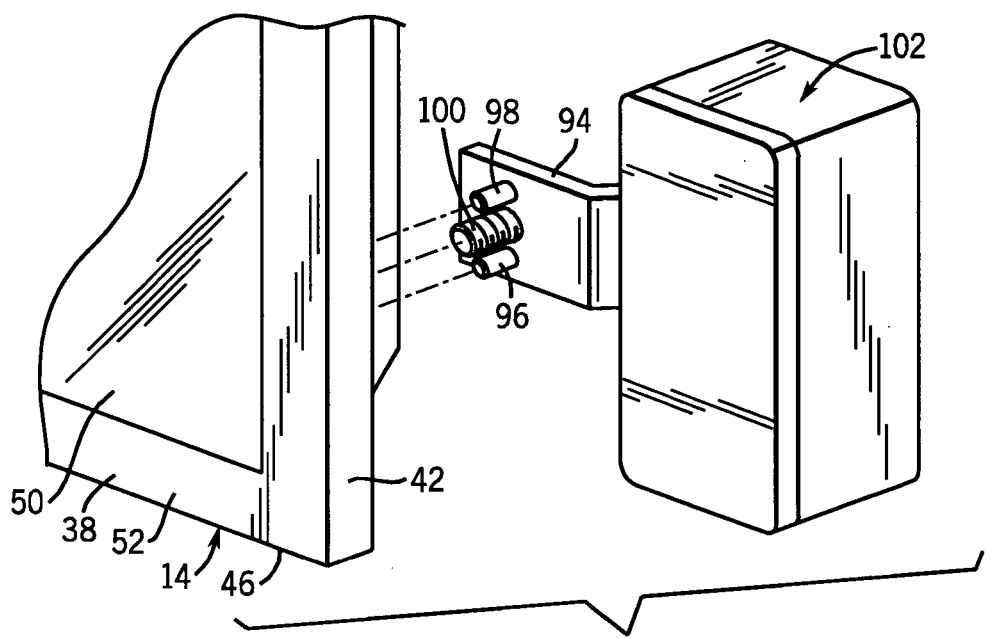
FIG. 5 is a front perspective view of an exemplary support member of a peripheral device exploded from a display in accordance with the embodiments of the present technique.
Figure 6:
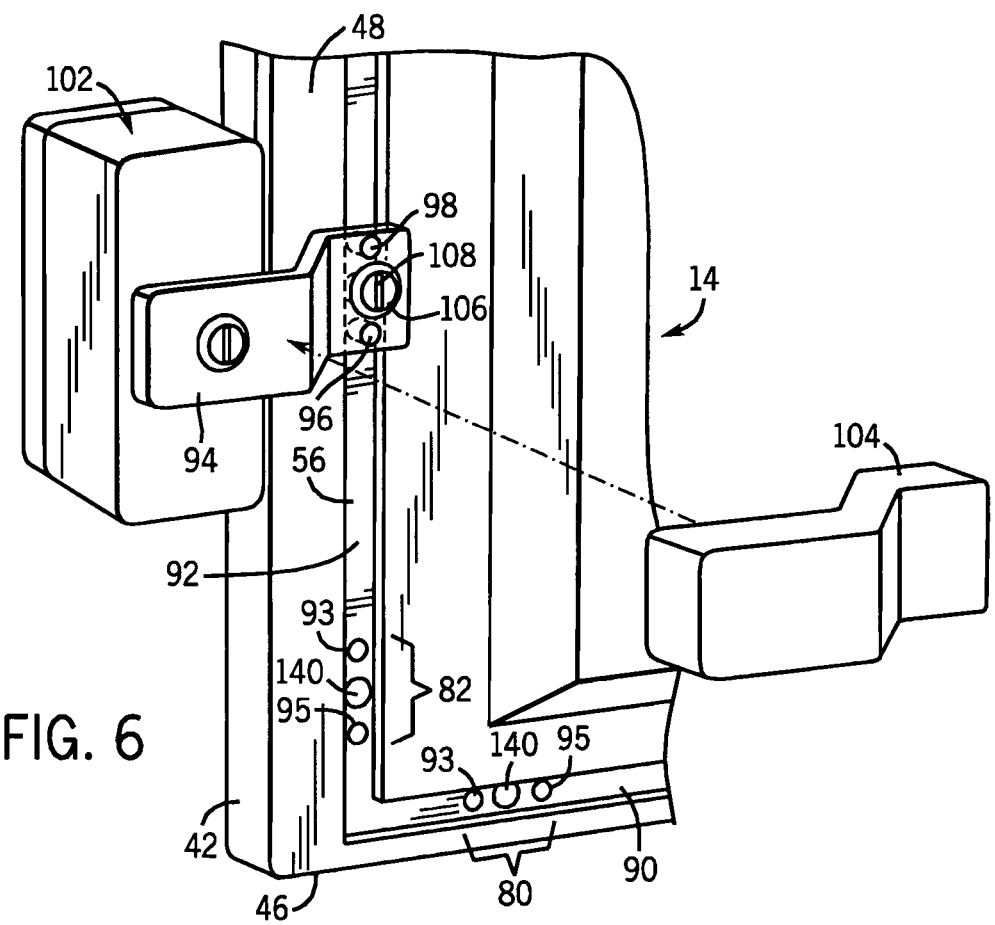
FIG. 6 is a rear perspective view of an exemplary support member of a peripheral device mounted to a display in accordance with the embodiments of the present technique.

FIGS. 5 and 6 illustrate front and rear perspective views of a peripheral device 102 and a display 14. As illustrated in FIG. 5, the alignment structures 96-98 and mating fastener 100 are exploded from the desired mount position on the rear face 48 of the display 14. As illustrated by FIG. 6, the exemplary peripheral device 102 includes a cover 104. The cover 104 snaps on to the support member 94 of the peripheral device 102. In some embodiments, the cover 104 includes apertures, channels, and/or cable harnesses to route wires from the peripheral device 102. Advantageously, the cover 104 enhances the aesthetic appeal of the peripheral device 102 by covering the mating fastener 100 and wires leaving the peripheral device 102.

The peripheral device 102, in the embodiment of FIG. 6, includes a mating fastener 106 configured to be turned by a flat device or tool, such as a coin, a flat-headed screw driver, or the like. The mating fastener 106 includes a slot 108 with a width selected so that the mating fastener 106 can be easily turned with a flat device or tool. As will be appreciated, other embodiments may include a mating fastener 106 with a different interface, such as a wing nut, Phillips head, allen head, or a tamper-proof security screw head, for example. Alternatively, the mating fastener 106 may be a thumb screw having an enlarged head to facilitate rotation without use of a tool.

The peripheral device 102 of FIGS. 5 and 6 attaches to the display 14 in the course of following steps. First, a user aligns the mating alignment structures 96 and 98 with the mounting groove 56. The mating alignment structures 96-98 are then inserted into mounting groove 56. Next, the peripheral device 102 is slid along the mounting groove 56 until a desired mount position 58-85 is found. When the peripheral device 102 is aligned with a desired mount position 58-85, the mating alignment structures 96-98 engage with alignment structures 93 and 95, aligning the mating fastener 106 with the fastener 140. Next, a user rotates the mating fastener 106 to threadably engage mating fastener 106 with fastener 140. Finally, a user snaps the cover 104 onto the support member 94, thereby covering the support member 94 and mating fastener 100.

FIG. 7 illustrates a computer system 10 including three displays 110-114 that are peripheral devices. In other words, four displays are coupled together via respective mount systems 12. The embodiment of FIG. 7 includes support members 116-130 that couple the displays 110-114 to the display 14 via respective mount systems 12. In the present embodiment, each of the displays 110-114 includes a mount system 12 that is similar to the mount system 12 on the rear face 48 of display 14 as illustrated in FIGS. 1-6 and discussed in detail above. However, other embodiments may employ displays 110-114 without a mount system 12, such as displays with a fixed support member integrated into the display. Support members 116-130 couple to displays 14 and 110-114 through the mount systems 12 on each of the displays 14 and 110-114. Advantageously, the present technique is scalable, and alternate embodiments include systems 10 employing two displays or more than four displays.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:
1. A system, comprising:
 a first display having a front face with a display screen for displaying an image, at least three sides adjacent to the front face, and a rear face behind the front face;
 a mounting groove disposed along a portion of the first display; and
 a plurality of mount positions along the mounting groove, wherein each mount position comprises:
  a cylindrical alignment structure disposed in the mounting groove; and a fastener disposed in the mounting groove, adjacent to the alignment structure, for receiving a mating fastener;

wherein the mounting groove is along the at least three sides of the first display;

wherein the mounting groove is disposed on the rear face of the first display adjacent the at least three sides and the mounting groove is depressed toward the front face, wherein the fastener comprises a threaded fastener integrated or fixed into the mounting groove.

2. The system of claim 1, wherein the mounting groove is along a peripheral portion of the first display.

3. The system of claim 1, wherein the alignment structure comprises a plurality of alignment portions disposed about the fastener.

4. The system of claim 1, wherein the first display comprises a computer integrated into a single flat panel housing.

5. The system of claim 1, comprising a computer coupled to the first display.

6. The system of claim 1, comprising a peripheral device with a mating alignment structure and a mating fastener.

7. The system of claim 6, wherein the peripheral device comprises a second display coupled to the first display with a multi-display bracket.

8. The system of claim 6, wherein the peripheral device is a mirror, a vase, a light, a computer port, a memory card reader, a biometric security device, a fan, a paper holder, an electronic digitizer pen holder, a wall mount, a security cable, a credit card magnetic stripe reader, a bar code scanner, a picture frame, a hand-held electronic-device docking station, a microphone, a display privacy blinder, a display polarizer, an anti-reflective screen, a key pad, a number pad, a touch pad, a display, a wireless-input-device re-charging station, a remote control sensor, a game console interface, a printer, a scanner, a facsimile machine, a communications hub, or an external memory device, or a combination thereof.

\* \* \* \* \*